(12) United States Patent
Johur

(10) Patent No.: US 7,761,085 B2
(45) Date of Patent: Jul. 20, 2010

(54) MOBILE STATION, SYSTEM, NETWORK PROCESSOR AND METHOD FOR USE IN MOBILE COMMUNICATIONS

(75) Inventor: Jason J. Johur, Earley (GB)

(73) Assignee: Motorola, Inc., Schaumburg, IL (US)

( * ) Notice: Subject to any disclaimer, the term of this patent is extended or adjusted under 35 U.S.C. 154(b) by 597 days.

(21) Appl. No.: 11/722,929

(22) PCT Filed: Dec. 9, 2005

(86) PCT No.: PCT/US2005/044585

§ 371 (c)(1),
(2), (4) Date: Jun. 27, 2007

(87) PCT Pub. No.: WO2006/073673

PCT Pub. Date: Jul. 13, 2006

(65) Prior Publication Data

US 2008/0102795 A1    May 1, 2008

(30) Foreign Application Priority Data

Dec. 31, 2004    (GB) ................................. 0428461.8

(51) Int. Cl.
*H04M 1/66* (2006.01)

(52) U.S. Cl. ........................ 455/411; 455/410; 455/433; 380/249; 380/273

(58) Field of Classification Search ............. 455/410, 455/411, 414.1, 433, 435.1–3; 380/44, 45, 380/247, 249, 259, 270, 273
See application file for complete search history.

(56) References Cited

U.S. PATENT DOCUMENTS

| | | | |
|---|---|---|---|
| 5,661,806 A | 8/1997 | Nevoux | |
| 5,940,512 A | 8/1999 | Tomoike | |
| 7,596,225 B2 * | 9/2009 | Mizikovsky et al. | ........ 380/273 |
| 7,660,417 B2 * | 2/2010 | Blom et al. | ................. 380/249 |
| 2004/0102181 A1 | 5/2004 | Horn | |

FOREIGN PATENT DOCUMENTS

EP    1124401 A2    8/2001

(Continued)

OTHER PUBLICATIONS

Supplemental European Search Report Dated Nov. 5, 2009.

(Continued)

*Primary Examiner*—CongVan Tran
(74) *Attorney, Agent, or Firm*—Terri S. Hughes; Anthony P. Curtis

(57) ABSTRACT

A method of operation in a mobile communication system includes a mobile station, a first network capable of serving the mobile station as a home network and a second network capable of serving the mobile station as a visited network, including carrying out in the home network the steps of: generating a random seed (RS), modifying the random seed by combination with an authentication key (K) held by the home network and the mobile station to form session keys (KS and KS'), sending the session keys (K'S and K'S') to the visited network to permit authentication of the mobile station, and characterized in that the following steps are carried out in the home network: providing a further modification key (SMK), and carrying out a further key modification (of KS and KS') in the production of the session key (K'S and K'S') using the further modification key (SMK).

17 Claims, 3 Drawing Sheets

FOREIGN PATENT DOCUMENTS

| | | |
|---|---|---|
| WO | WO9849855 A2 | 11/1998 |
| WO | WO2004075584 A1 | 9/2004 |

OTHER PUBLICATIONS

"Terrestrial Trunked Radio (TETRA); Voice Plus Data (V+D); Part 7:Security; Draft ETSI EN 300 392-7" ETSI Standards, Lis, Sophia Antipolis, Cedex, France, vol. TETRA:TETRA-6, No. V2.1.23, Apr. 1, 2004, XP014035904, ISSN:0000-0001.
Chinese Office Action Dated May 8, 2009.
Korean Office Action Dated Sep. 29, 2009.
Korean Office Action Dated Nov. 13, 2008.
GBR Granted Patent Dated Apr. 9, 2009.

* cited by examiner

MOBILE STATION, SYSTEM, NETWORK PROCESSOR AND METHOD FOR USE IN MOBILE COMMUNICATIONS

CROSS REFERENCE TO RELATED APPLICATIONS

This application claims the benefit of prior filed co-pending international application Serial No. PCT/US05/44585 filed on Dec. 9, 2005, and Great Britain application Serial No. 0428461.8 filed on Dec. 31, 2004. Both of these applications are assigned to Motorola, Inc.

FIELD OF THE INVENTION

The present invention relates to a mobile station, a system, a network processor and a method for use in mobile communications. In particular, the invention relates to establishing security of communication between a trunked network and a mobile station able to migrate between different trunked networks.

BACKGROUND OF THE INVENTION

A cellular or trunked communication system is one in which mobile or portable user terminals, such as mobile telephones or portable or vehicle mounted radios, herein collectively referred to as 'mobile stations' or 'MSs', can communicate via a system infrastructure which generally includes one or more fixed base stations (base transceiver stations) and other routing and control installations. Each base station has one or more transceivers which serve MSs in a given region or area known as a 'cell' or 'site' by radio communication. The cells of neighbouring base stations are often overlapping.

A mobile communication system providing wide area coverage may be considered as being formed of a plurality of interlinked networks. Each network includes an infrastructure comprising in its simplest form at least a router (or zone controller or switch) which routes communications to and from the network and within the network, one or more base stations and an authentication processor which authenticates and registers MSs for use in the network. The networks may communicate by various known means such as radio or microwave communication, hard wired electrical or optical communication, and the internet.

It is usual for a MS of a particular user registered with a mobile system operator to have a 'home' network which normally provides a communication service to the user. If the user moves to another region not covered by the home network, e.g. to a foreign country, it is still possible for the user to receive a service from the local network. An authentication process between the user's home network and the 'visited' network needs to be completed satisfactorily before the service from the visited network proceeds.

One particular type of mobile communication system widely used in Europe and elsewhere to support communications within organisations such as public safety services and enterprises is a TETRA system. Such a system is one designed to operate in accordance with the TETRA (Terrestrial Trunked Radio) standard procedures or 'protocol' defined by the European Telecommunication Standards Institute (ETSI). In order to provide authentication as part of registration of a particular user's MS in a home TETRA network, an authentication key 'K' is used. This is programmed into the MS at a secure location such as the manufacturer's factory and is stored in a memory of the MS. A copy of 'K' is stored in a memory of the home network infrastructure associated with the infrastructure's authentication processor. The authentication processor will also hold information relating to the identity of MSs registered to operate in the network, including the identity of a particular MS holding a particular key K.

With respect to operation in a TETRA system, when a user visits a geographical region other that in which the home network of the user's MS is located and service is possible from a visited network, i.e. a local network which can in general be any network other than the home network of the user's MS, the visited network will need to authenticate the visiting MS to ensure it is genuine, before providing access to network services. Similarly, the MS will also authenticate the visited network to ensure the network can be trusted. The visited network is able to perform authentication with the visiting MS because the home network supplies session authentication information or 'SAI' to the visited network. The SAI includes a random seed (RS) and authentication session keys (KS and KS'). KS and KS' are derived by the authentication processor of the home network from K for the particular MS and RS. The MS is able to generate the same SAI (consisting of RS, KS and KS') using its stored K and the RS supplied to it from the home network. The derived key KS is for use by the authentication processor of the visited network to authenticate the MS and the derived key KS' is for use by the MS to authenticate the visited network. If authentication is successful, then trust is established between the MS and the visited network and communication between the two can proceed.

There is a problem with this known procedure in that the issued SAI is not limited in time. Once the visited network has possession of the SAI, the visited network may authenticate successfully with the MS ad infinitum, or at least until the MS's authentication key K changes; the latter would invalidate all previously generated SAI. If a visited network were to become non-trusted in the future, or if the information supplied to the visited network were to become compromised, e.g. known to a would-be fraudulent operator, the authentication process would still work in a situation when it clearly should not. Adversaries that have possession of the SAI would be able to set up spoof base stations that appear to the MS as part of the home network, and similarly would-be fraudulent operators would be able to set up a spoof MS.

If only one MS were to have its SAI compromised then the simplest approach to deal with the problem would be to provision a new K into the MS and the home network. However, if the compromise of SAI occurred on a large scale, e.g. someone hacked into a visited network containing SAI for thousands of MS, it would be prohibitive in terms of cost to recall thousands of MS to be provisioned with new K, not to mention the loss of the authentication service, particularly on the home network, and the lost service and revenues by the operator associated with that.

Current commercial cellular communication systems involve the use of one-way authentication only (i.e. authentication of the MS), since the main security threat is fraudulent use of network services by rogue MS(s). These networks provide in one inter-system transaction a random challenge, expected response and cipher key, from the home network to the visited network. The visited network therefore has all the information required to perform the one-way authentication with the MS, without involving the home network any further. Unfortunately, this methodology is not practical in TETRA systems owing to the fact that mutual authentication (i.e. two-way authentication) requires the MS to provide a random challenge part-way through the air interface protocol exchange, and therefore it is preferred for the home network to supply the visited network with SAI that is required to allow the visited network to perform all aspects of the mutual authentication in real time. In consequence, there is no TETRA system currently commercially available which supports mutual authentication over an inter-network interface. Therefore, the problem of how to deal with a large scale compromise of SAI held by a visited network has therefore not been dealt with thus far.

DESCRIPTION OF EMBODIMENTS OF THE INVENTION

By the invention, a further session modification key is generated by the home network and is provided to the mobile station, preferably when communicating directly with the home network. The further session modification key is changed periodically and/or when SAI previously provided to a visited network is suspected to have been compromised. The further session modification key is used in the home network and in the mobile station to produce modified session keys which are different from any already held by the visited network.

The invention beneficially solves the serious security problems of the prior art described earlier. Furthermore, in order to apply the invention, no change is needed to the industry operating protocols nor to the implementation procedure applied in the visited network. Conveniently, the session modification key may be a key that is already generated and sent to the mobile station for another purpose.

Figure 1:
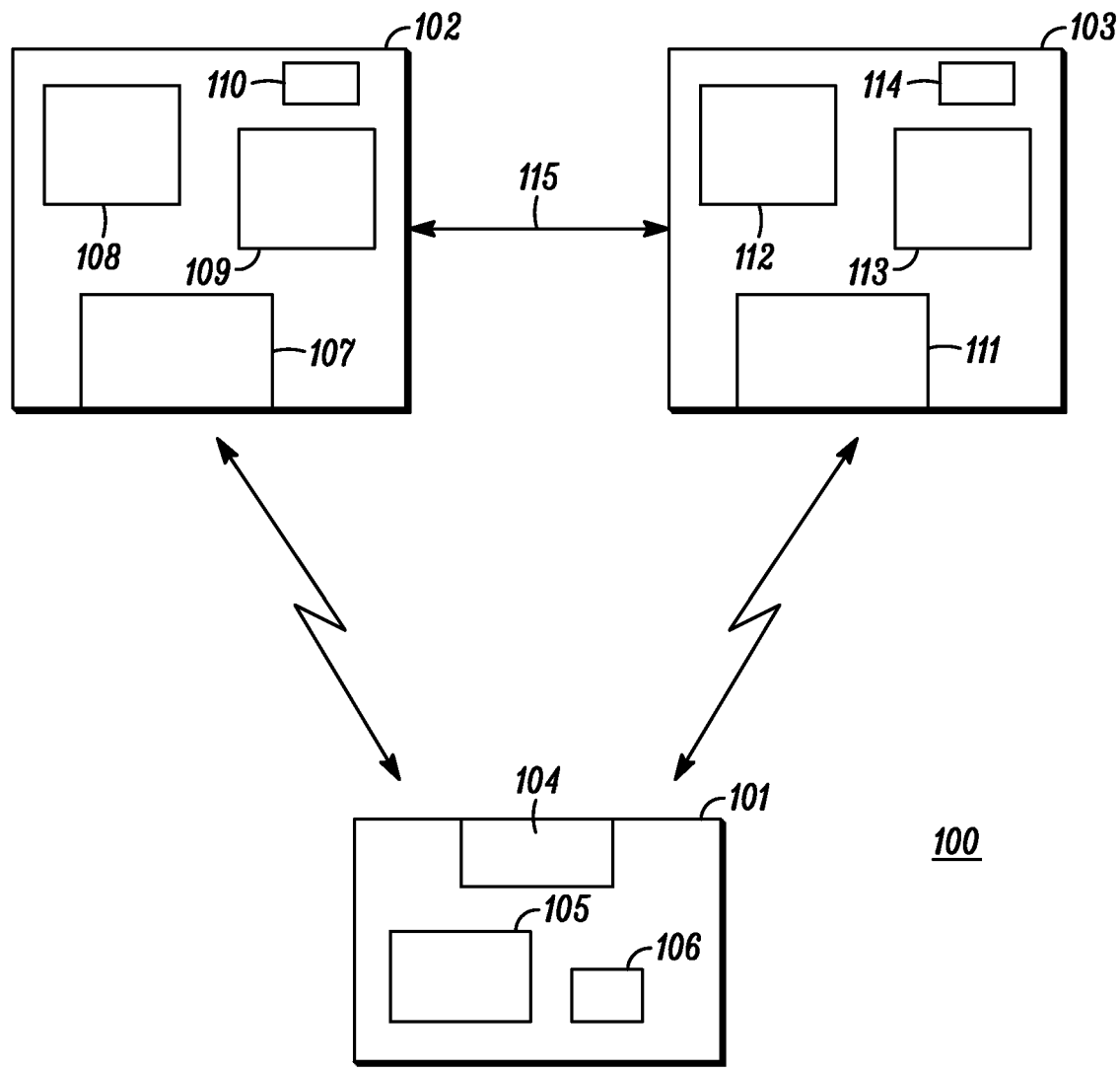
FIG. 1 is a block schematic diagram of a mobile communication system embodying the present invention.

FIG. 1 is a block diagram showing a TETRA communication system 100 including a MS (mobile station) 101 and two networks 102, 103. The network 102 is the home network of the MS 101 and the network 103 is another network with which the MS 101 is able to communicate as a visited network when a mutual authentication procedure between the network 103 and the MS 101 has taken place.

The MS 101 includes as main components (together with other components not shown) an RF transceiver 104 and a central processor 105 which controls functional operations in the MS 101 and is operationally connected to the transceiver 104. The MS 101 also includes a memory 106 operationally connected to the processor 105. The memory 106 includes stored data and programs needed in operation by the processor 105.

The home network 102 includes as main components (together with other components) a base station 107 which includes one or more transceivers providing radio communication with the transceiver 104 of the MS 101 when the MS 101 is within range of the base station 107. The home network 102 also includes a router 108 for routing communications into and out of the network 102 and within the network 102, an authentication processor 109 which carries out authentication functions of the home network 102 and a memory 110 which stores data and programs needed in operation by the authentication processor 109.

The visited network 103 includes as main components (together with other components) a base station 111 which includes one or more transceivers providing radio communication with the transceiver 104 of the MS 101 when the MS 101 is within range of the base station 111 and mutual authentication of the network 103 and the MS 101, as described later, has been successfully completed. The visited network also includes a router 112 for routing communications into and out of the network 103 and within the network 103, an authentication processor 113 which carries out authentication functions of the visited network 103 and a memory 114 which stores data and programs needed in operation by the authentication processor 113.

A link 115 exists between the home network 102 and the visited network 103. The link 115 may be formed in one of the ways described earlier in connection with the prior art.

Figure 2:
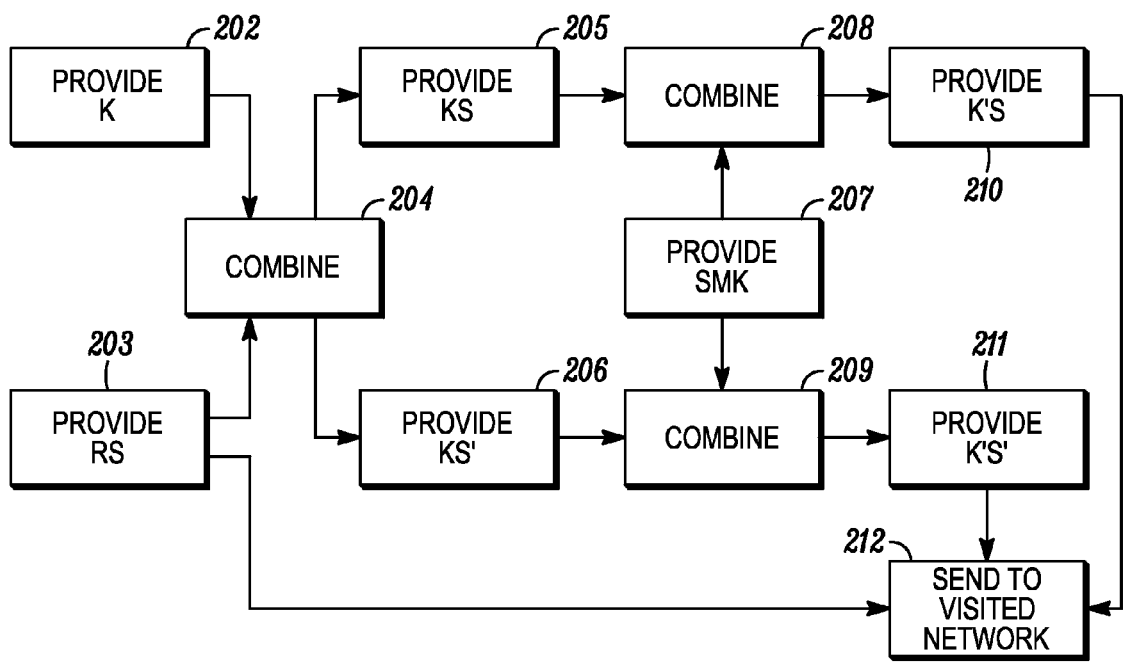
FIG. 2 is a flow diagram of a method embodying the present invention.

FIG. 2 is flow diagram illustrating a method 200 of operation of the invention. The method operates in the authentication processor 109 of the home network 102. The authentication key K is provided in step 202 by retrieval from the memory 110. A random seed RS is provided in a step 203. Essentially this is a random number generated within the authentication processor 109. The random seed RS and the authentication key K are combined in a combine step 204. This step and the other combine steps referred to herein may be by any of the combination operations known in the art, e.g. addition, multiplication, exclusive OR, etc. The combine step 204 combines K and RS in two different ways to provide respectively a first authentication session key KS in a step 205 and a second authentication session key KS' in a step 206.

All of the steps 201 to 206 are as carried out in the prior art. However, in accordance with an embodiment of the invention, a session modifier key SMK is produced by the authentication processor 109 in a step 207. Production of this key may for example have been triggered in response to detection of an actual or suspected compromise situation. Alternatively, a new key SMK may be produced at regular intervals, e.g. every six months or every year. The session modifier key SMK is combined with the key KS in a combine step 208. The result of this is to provide a modified session key K'S in a step 210. In addition, the session modifier key SMK is combined with the key KS' in a combine step 209. The result of this is to provide a modified session key K'S' in a step 211. The modified session keys K'S and K'S' are sent together with the random seed RS to the visited network 103 via the link 115 (FIG. 1) in a step 212 for use by the network 103 in mutual authentication between the network 103 and the MS 101.

In practice, when the MS 101 attempts registration on a network such as the network 103, the network will force the MS 101 to authenticate and the MS 101 may also respond by forcing the network to authenticate. The registration of the MS 101 will be accepted only when authentication is completed.

A method similar to the method 200 operates in the processor 105 of the MS 101. The MS retrieves K from its memory 106 and receives RS and SMK from the authentication processor 109 via over the air communication from the base station 107 to the transceiver 104. The values of RS and SMK may be sent to the MS 101 at different times and stored in the memory 106. Thus, these values may have been received by the MS 101 when in communication directly with the home network 102. The method of generating K'S and K'S' does not need to operate in the processor 105 of the MS 101 until the MS 101 detects that it is attempting to register with the visited network 103. It detects that the visited network is not its home network because a signal is broadcast by the network 103 giving the identity (Mobile Network Identity or 'MNI') and the processor 105 of the MS 101 will determine that the broadcast identity does not match that of the home network 102 which is stored in the memory 106 of the MS 101.

The visited network 103 and the MS 101 use the values of RS, K'S and K'S' in a known manner defined in the TETRA standard, as they would with the unmodified values RS, KS and KS' in the prior art, to carry out the required mutual authentication.

Figure 3:
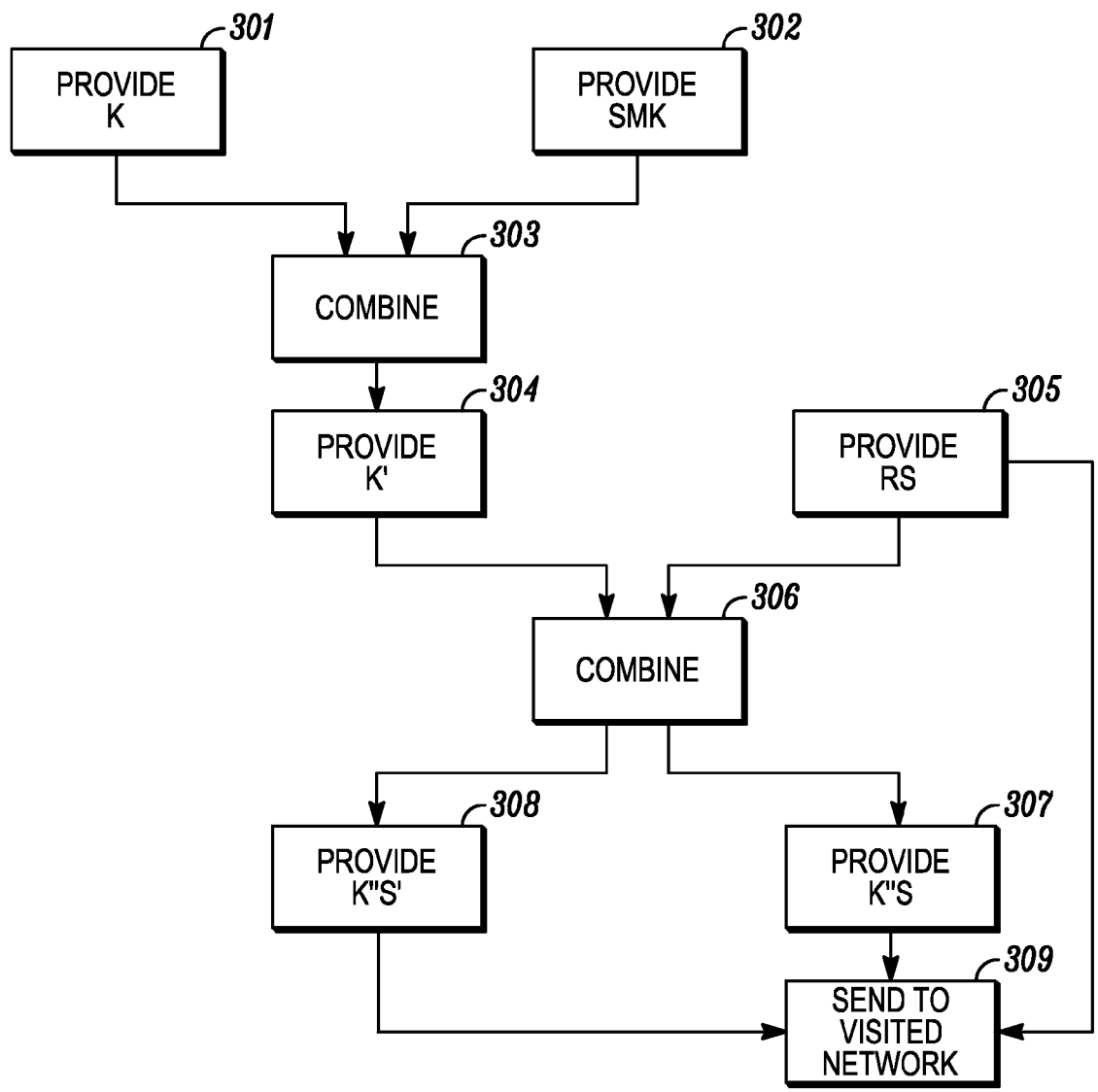
FIG. 3 is a flow diagram of an alternative method embodying the present invention.

FIG. 3 is a block diagram showing steps in an alternative method 300 operated in the authentication processor 109 of the home network 102. In this case, the authentication key K is provided in a step 301 and the session modifier key SMK is provided in a step 302. In a combine step 303, K and SMK are combined to provide a modified authentication key K' in a step 304. A random seed RS is provided in a step 305. The modified authentication key K' and the random seed RS are combined in a combine step 306. A modified session key K"S and a modified session key K"S' are provided from the combination in steps 307 and 308 respectively. The modified session keys K"S and K"S' are sent together with the random seed RS in a step 309 to the visited network 103 via the link 115 (FIG. 1) for use in authentication with the MS 101.

A method similar to the method 300 operates in the processor 105 of the MS 101. The MS 101 retrieves K from its memory 106 and receives RS and SMK from the authentication processor 109 via over the air communication from the base station 107 to the transceiver 104. The values of RS and SMK may be sent to the MS 101 at different times and stored in the memory 106. Thus, these values may have been received by the MS 101 when in communication directly with the home network 102. The method of generating K"S and K"S' does not need to operate in the processor 105 until the MS 101 detects that it is attempting to register with the visited network 103.

In the above procedures embodying the invention, only the MS 101 and the home network 102 possess the session modifier key SMK. When the MS 101 initially attempts to register with the network 103 it will provide its own identity ('ISSI') and the identity (MNI) of its home network 102. The visited network 103 will thereby know the identity of the home network 102 of the MS 101. The visited network 103 may thereby send a communication to the network 102 to enquire about the MS 101. In particular, the network 103 will send a request to the home network 102 to provide the SAI for the mutual authentication procedure. The home network 102 will thereby supply the SAI which will contain the modified keys K'S and K'S' or K"S and K"S' (i.e. modified KS and KS'), as well as the random seed RS, so that the visited network 103 can perform authentication with the visiting MS 101 using the modified keys. From the perspective of the visited network 103, there are no changes to existing functionality needed to implement the method embodying to the invention. Thus, the modified session keys can be considered as equivalent to the session keys known in the prior art whereas the procedure to generate those keys, involving an additional modification key SMK, can be considered as a new procedure. New functionality has to be implemented in the MS 101 (essentially in the processor 105), and also in the home network 102 (essentially in the processor 109), to provide operation in accordance with an embodiment of the invention.

A preferred implementation of the method embodying the invention is to use a key which is already sent to the MS 101 for other purposes. For example, a key known as the GSKO ('Group Session Key for OTAR', where 'OTAR' is over the air re-keying) may be used. This is a key that is changed periodically and which is known to the MS 101 and the home network 102 but not to the visited network 103. Using such an existing periodically changed key beneficially allows the invention to be operated without any changes to the TETRA standard.

A similar procedure of using a SMK to modify SAI before providing it to a visited network only could also be used similarly for protecting other session keys sent to visited networks such as the Session Key for OTAR ('KSO') which is also provided to visited networks for over the air re-keying other TETRA keys. The key KSO is not currently time-bound in currently available TETRA systems but could advantageously be made so if modified in accordance with an embodiment of the invention. This procedure involves the relevant MS and the two relevant networks operating in a manner similar to that described earlier with reference to FIG. 2 or 3.

The invention claimed is:

1. A method of operation in a mobile communication system including a mobile station, a first network capable of serving a mobile station as a home network and a second network capable of serving the mobile station as a visited network, including carrying out in the home network the steps of:
    obtaining an authentication key held by the home network and the mobile station:
    generating a random seed,
    forming a modified session key by a key combining procedure which includes use of the authentication key; and
    sending the modified session key and the random seed to the visited network to permit authentication of the mobile station with the visited network,
    wherein the key combining procedure is carried out in only the home network and the mobile station to form the modified session key and the key combining procedure includes:
    obtaining a session modification key that is known only to the home network and the mobile station, and
    combining the session modification key with a key used in the key combining, procedure to form the modified session key, the key combined with the session modification key being either the authentication key or a session key derived from the authentication key.

2. A method according to claim 1 wherein the session modification key is produced by the home network and is changed either a) periodically to produce a series of different further modification keys or b) when unauthorised release or knowledge of a previously supplied session key has been detected or is suspected.

3. A method according to claim 1 wherein the key combination procedure comprises combining the session modification key with a session key produced by combination of the authentication key and the random seed to produce the modified session key.

4. A method according to claim 1 wherein the key combination procedure comprises combining the authentication key with the session modification key to produce a modified authentication key for use in combination with the random seed to form the modified session key.

5. A method according to claim 1 wherein key combination procedure forms two modified session keys and the step of sending to the visited network includes sending the two modified session keys to permit mutual authentication of the visited network and the mobile station.

6. A method according to claim 5 wherein the following steps are carried out in the mobile station: receiving the random seed from the home network, receiving the session modification key from the home network, and operating the key combination procedure to form the modified session keys, including modifying the random seed in the key combining procedure by combination with the authentication key to form session keys, combining the session keys with the session modification key to form the modified session keys and using the modified session keys to permit authentication between the mobile station and the visited network.

7. A method according to claim 5 wherein the following steps are carried out in the mobile station: receiving the random seed from the home network, receiving the session modification key from the home network, and operating the key combination procedure to form the modified session keys including combining the authentication key with the session modification key to form a modified authentication key, combining the modified authentication key with the random seed to form the modified session keys and using the modified session keys to permit authentication between the mobile station and the visited network.

8. A method according to claim 5, further comprising the mobile station and the visited network carrying out mutual authentication by use of the two modified session keys.

9. A method according to claim 1 wherein the random seed and the session modification key are sent either a) by the home network to the mobile station by radio communication or b) to the mobile station in separate communications.

10. A method according to claim 1 wherein the session further modification key is a key which is sent to the mobile station for another purpose.

11. A method according to claim 2 wherein the key combination procedure comprises combining the session modification key with a session key produced by combination of the authentication key and the random seed to produce the modified session key.

12. A method according to claim 2 wherein the key combination procedure comprises combining the authentication key with the session further modification key to produce a modified authentication key for use in combination with the random seed to form the modified session key.

13. A method according to claim 1 wherein the key combining procedure further includes use of the random seed.

14. A method according to claim 2 wherein key combination procedure forms two modified session keys and the step of sending to the visited network includes sending the two modified session keys to permit mutual authentication of the visited network and the mobile station.

15. A method according to claim 14 wherein the following steps are carried out in the mobile station: receiving the random seed from the home network, receiving the session modification key from the home network, and operating the key combination procedure to form the modified session keys, including combining the authentication key with the session modification key to form a modified authentication key, combining the modified authentication key with the random seed to form the modified session keys and using the modified session keys to permit authentication between the mobile station and the visited network.

16. A method according to claim 14 wherein the following steps are carried out in the mobile station: receiving the random seed from the home network, receiving the session modification key from the home network, and operating the key combination procedure to form the modified session keys, including modifying the random seed in the key combining procedure by combination with the authentication key to form session keys, combining the session keys with the session modification key to form the modified session keys and using the modified session keys to permit authentication between the mobile station and the visited network.

17. A method according to claim 14, further comprising the mobile station and the visited network carrying out mutual authentication by use of the two modified session keys.

* * * * *

UNITED STATES PATENT AND TRADEMARK OFFICE
CERTIFICATE OF CORRECTION

| | | |
|---|---|---|
| PATENT NO. | : 7,761,085 B2 | Page 1 of 1 |
| APPLICATION NO. | : 11/722929 | |
| DATED | : July 20, 2010 | |
| INVENTOR(S) | : Johur | |

It is certified that error appears in the above-identified patent and that said Letters Patent is hereby corrected as shown below:

IN THE CLAIMS

1. In Column 6, Line 38, in Claim 1, delete "combining," and insert -- combining --, therefor.

2. In Column 6, Line 58, in Claim 5, delete "wherein key" and insert -- wherein the key --, therefor.

3. In Column 7, Line 1, in Claim 6, delete "combining," and insert -- combining --, therefor.

4. In Column 7, Line 26, in Claim 10, before "modification" delete "further".

5. In Column 7, Line 35, in Claim 12, before "modification" delete "further".

Signed and Sealed this
Eighth Day of November, 2011

David J. Kappos
*Director of the United States Patent and Trademark Office*